United States Patent
Deeds

(10) Patent No.: US 7,177,629 B1
(45) Date of Patent: Feb. 13, 2007

(54) ANNUNCIATING APPARATUS, AND ASSOCIATED METHOD, FOR SELECTABLY ANNUNCIATING MESSAGE TERMINATION AT A RADIO COMMUNICATION DEVICE

(75) Inventor: Douglas Deeds, Fort Worth, TX (US)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/565,146

(22) Filed: May 5, 2000

(51) Int. Cl.
H04M 3/42 (2006.01)

(52) U.S. Cl. .................. 455/415; 455/404.1; 455/458; 455/567

(58) Field of Classification Search ................ 455/404, 455/415, 424, 458, 567, 566, 550, 404.1, 455/404.2, 550.1; 340/825.26, 825.27, 7.1–7.63, 340/7.48, 7.52, 7.55, 7.56, 7.29, 7.62
See application file for complete search history.

(56) References Cited

U.S. PATENT DOCUMENTS

| | | | | |
|---|---|---|---|---|
| 5,504,476 A | * | 4/1996 | Marrs et al. | 340/825.44 |
| 5,559,860 A | | 9/1996 | Mizikovsky | 379/58 |
| 5,797,098 A | * | 8/1998 | Schroeder et al. | 455/464 |
| 5,819,184 A | | 10/1998 | Cashman | 455/553 |
| 6,032,053 A | | 2/2000 | Schroeder et al. | 455/553 |
| 6,091,947 A | * | 7/2000 | Sumner | 455/413 |
| 6,094,587 A | * | 7/2000 | Armanto et al. | 455/567 |
| 6,137,525 A | * | 10/2000 | Lee et al. | 348/14.02 |
| 6,233,430 B1 | * | 5/2001 | Helferich | 455/31.1 |
| 6,473,621 B1 | | 10/2002 | Heie | 455/466 |
| 6,490,343 B2 | * | 12/2002 | Smith et al. | 379/52 |
| 6,496,692 B1 | * | 12/2002 | Shanahan | 455/418 |
| 6,553,222 B1 | * | 4/2003 | Weiss | 455/415 |

FOREIGN PATENT DOCUMENTS

| | | |
|---|---|---|
| JP | 11187460 | 9/1999 |
| WO | WO 99/27726 | 3/1999 |
| WO | WO 00/22794 | 4/2000 |

OTHER PUBLICATIONS

Rappaport, "Wireless Communications" Copyright 1996; pp. 509-512.*

* cited by examiner

*Primary Examiner*—Edan Orgad
(74) *Attorney, Agent, or Firm*—Alston & Bird LLP

(57) ABSTRACT

Apparatus, and an associated method, selectably annunciates a message or call terminating at a mobile station. Examination is made of an indicia of the terminating message or call, and responsive thereto, selected annunciation is made of the terminating message or call. Determination of whether, and in what manner, to annunciate the terminating message or call is made responsive to a rule-set selected by the user of the mobile station.

20 Claims, 4 Drawing Sheets

| CONTENT | MESSAGE TYPE | CALLING PARTY | RING OR TUNE TO BE PLAYED |
|---|---|---|---|
| TEXT "HAPPY BIRTHDAY" | SMS | <ANYONE> | "HAPPY BIRTHDAY" |
| TEXT "LOVE" | SMS | SPOUSE | "I JUST CLLED TO SAY I LOVE YOU" - STEVIE WONDER |
| TEXT "NOK" OR "MOT" OR "MSFT" OR "HD" | WAP | NA | THEME FROM "WALL STREET WEEK" |
| TEXT "NOK" AND "+" | WAP | NA | "WE'RE IN THE MONEY" |
| TEXT "NOK" AND "-" | WAP | NA | "BROTHER, CAN YOU SPARE A DIME" |
| TEXT "MOT" AND "-" | WAP | NA | "CHARGE" |
| TEXT "VIAGRA" OR "XXX" OR "DISCOUNT" OR "!!" OR "!!!" | WAP OR SMS | NA OR <ANYONE> | <NO RING> |

*FIG. 3*

ANNUNCIATING APPARATUS, AND ASSOCIATED METHOD, FOR SELECTABLY ANNUNCIATING MESSAGE TERMINATION AT A RADIO COMMUNICATION DEVICE

The present invention relates generally to a manner by which to annunciate a call, or other message, terminating at a radio device, such as a mobile station operable in a cellular communication system. More particularly, the present invention relates to apparatus, and an associated method, by which to selectably annunciate the terminating message in a selected manner. Whether, and in what manner, to annunciate the terminating message is selected responsive to various indicia, such as the type of message, the identity of the sending party which sends the message to be terminated at the mobile station, or other radio device, or the content of the message.

BACKGROUND OF THE INVENTION

The use of wireless communication systems by which to communicate telephonically has achieve wide popularity in recent years. Telephonic communication, by way of various types of wireless communication systems, permits the communication of both voice and nonvoice data between sending and receiving stations of such communication systems.

As a wireline connection is not required to effectuate communication in a wireless communication system, improved mobility of communications in a wireless communication system, relative to communication by way of conventional wireline communication systems, is inherently possible. Because a wireless connection is formed, connection limitations conventionally otherwise required in a wireline system do not correspondingly limit movement of communication stations operable in a wireless communication system.

A cellular communication system is exemplary of a wireless communication system which has achieved high levels of utilization. A cellular communication system is a multi-user communication system permitting large numbers of subscribers, i.e., users, to communicate telephonically through the use of mobile stations operable in such cellular communication systems. Various types of cellular communication systems have been developed and implemented throughout large geographical areas. Some cellular communication systems permit the communication of non-real time messages, such as packet-formatted messages forming alphanumeric text. SMS (Short Message Service) messaging in the GSM (Global System for Mobile communications) cellular communication system is exemplary of a non-real time message communicable to a mobile station. Subsequent to delivery at the mobile station, the SMS message is at least selectably displayable upon a screen display of the mobile station.

Cellular communication systems have also been proposed which comply with a WAP (Wireless Application Protocol) standard specification. The WAP standard specification also provides for the communication of non-real time, packet-formatted data. In manners analogous to the manner by which SMS messages are communicated to the mobile station to be displayed thereat, WAP messages are also communicable to a mobile station, also to be displayed thereat.

A mobile station operable in a system capable of communicating non-real time messages as well as conventional real time signals would be capable of receiving conventional, voice calls, conventional facsimile calls, as well as packet-formatted, non-real time messages.

Different communication-types might be of different priorities to the user of the mobile station. For instance, a voice call to be terminated at the mobile station might be of high priority to the user while a non-real time, packet-formatted message might be of lesser priority for the user. Also, the content of different non-real time messages might also be of different priorities to the user of the mobile station. For instance, an advertising message might be of a low priority to the user but certain other informational messages might be of higher priority to the user. And, the origin location, i.e., the identity of the sending party, might also be determinative to the user of the mobile station of the priority to be associated with the message. Any of various indicia, therefore, might well be determinative of the priority desired by the user to be associated with a message or call to be terminated at the mobile station.

Existing manners by which to alert the user of the mobile station of termination thereat of a communication message, such as a voice call or non-real time message, generally does not adequately distinguish, in the alert, between the different levels of priority to be associated with the terminating message or call.

A mobile station generally is constructed in manners such that its user interface mimics, to as great an extent possible, operation of a conventional, wireline device. For instance, when a conventional voice call is to be terminated at the mobile station, a paging signal is first communicated to the mobile station and a ringing tone is generated at the mobile station to alert the user of the terminating call. When the call is accepted, the ringing tone is stopped, and conventional voice communications are thereafter effectuated. The termination of a non-real time message at the mobile station is generally either alerted in the same manner by which a voice call is terminated at the mobile station or is not alerted in any manner. Also, although many non-real time, packet-formatted messages include indications of the location, or person, at which the message originated, is contained in the message, as well as the information generally is not utilized to alert the user of reception of a message originated at a particular location.

A manner by which better to alert a user of a message of a selected communication type at a mobile station, or other radio device, would therefore be advantageous.

Further, a manner by which to selectably alert a user of the mobile station, or other radio device, of determination thereat of a message of a particular content would also be advantageous.

Additionally, a manner by which to selectably alert a user of the mobile station, or other radio device, of determination thereat of a message originated at a particular location would also be advantageous.

It is in light of this background information related to manners by which to annunciate termination of a message at a radio device that the significant improvements of the present invention have evolved.

SUMMARY OF THE INVENTION

The present invention, accordingly, advantageously provides a manner by which selectably to annunciate a call, or other message, terminating at a radio device, such as a mobile station operable in a cellular communication system.

In one aspect of the present invention, apparatus, and an associated method, is provided by which selectably to annunciate the terminating message at the mobile station in a selected manner. Examination of the terminating message is made to determine an indicia related to the message. Responsive to such examination of the terminating message, a determination is made whether, and in what manner, to annunciate the terminating message.

In one implementation, the examination of the terminating message is made to determine the type of message which is to be terminated at the mobile station. Selection as to whether, and in manner, to annunciate reception of the terminating message at the mobile station is made responsive to the indicia-type of the terminating message. For instance, selection might be made to annunciate a real-time voice call but not to annunciate a non-real time message, such as a packet-formatted, SMS, or other, non-real time message. Or, a real-time call might be selected to be annunciated in a first manner and a non-real time message might be selected to be annunciated in another manner. Once the selection is made, and the message is terminated at the mobile station, the selected annunciation, if any, is effectuated by an annunciator located at the mobile station.

In another aspect of the present invention, examination of the terminating message is made to identify its contents. Such an examination can be made of non-real time messages. Responsive to examination of the terminating message to determine its informational content, a determination is made whether, and in what manner, to annunciate the terminating message. Certain messages, such as messages relating to, e.g., stock market data, might be elected to be annunciated while messages containing other types of informational content, e.g., advertising messages, might be selected not to be annunciated.

In another implementation, examination of the terminating message is made to determine the location of its origin, viz., the identity of the sending party. Responsive to determination of the location of the origin of the message, a determination is made whether to annunciate detection of the message at the mobile station responsive to the identity of the sending party. And, different messages originated at the differing sending parties are annunciated in different manners. Thereby, a user of the mobile station, with knowledge of the manner by which messages originated by differing sending parties are made, is made aware of the sending party prior to accepting, or viewing, the message when terminated thereat.

In an exemplary implementation, an embodiment of the present invention forms a portion of a GSM (Global System for Mobile communications) cellular communication system which provides for SMS (Short Message Service) messaging. The mobile station operable in the GSM system is capable of originating, as well as to have terminating thereat, both real-time calls and non-real time messages, here, SMS messages. When a message, either a non-real time, or a real-time, message is communicated to the mobile station, examination of the terminating call or message is made. Responsive to the determinations made in such an examination, determination is made whether to annunciate and, if so, in what manner, the terminating call or message. Then, responsive to such determination, annunciation of the terminating message is selectably made to alert the use of the mobile station of the terminating message.

In one implementation, examination of the terminating message is performed at the mobile station and determination, responsive thereto, of whether, and in what manner, to annunciate the terminating message is made at the mobile station. In such an implementation, user entry, such as by way of a user input keypad of the mobile station, permits input of user selections of the manners, and whether, terminating messages are to be annunciated. And, during usage of the mobile station, reselection of the user selections can analogously be made.

In another implementation, examination of the message or calls is made at the network infrastructure of the communication system. Once examination is completed and determination is made at the network infrastructure as to whether the mobile station is to, and in what manner to, annunciate the terminating message or call, an indication of such determination is communicated to the mobile station. In such an implementation, selection of the annunciation manner is made, for instance, pursuant to a service subscription. Or, selection and reselection is made by appropriate communication by the user of the mobile station. For instance, in one implementation, the user is able to access the examining and determining location by way of an Internet connection thereto. Uploading of user selection of which, and in what manner, to annunciate the termination of messages at the mobile station is uploaded by way of the Internet to the network-based location.

In these and other aspects, apparatus, and an associated method, is provided for a radio device having radio receiver circuitry operable to receive at least alternately a first indicia-type communication signal and at least a second indicia-type communication signal in a radio communication system. A manner for selectably annunciating reception at the radio device at least one of the first and at least second indicia-type communication signals. An examiner is coupled to receive indications of the at least one of the first and at least second indicia-type communication signals communicated to the radio device. The examiner examines an indicia of the communication signals. A determiner is coupled to the examiner to receive indications of examinations made thereat. The determiner, responsive to such indications, determines whether, and in what manner, to annunciate termination of the at least one of the first and at least second indicia-type communication signals at the mobile station. An annunciator is coupled to receive indications of determinations made by the determiner. Responsive thereto, and in response to termination of the communication signals at the mobile station, annunciation is selectably made of such termination.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 1A generally illustrating a mobile station and FIG. 1B generally illustrating the network infrastructure.

FIG. 3 illustrates a table listing exemplary messages generated in the communication system shown in FIG. 1 and exemplary annunciation tunes generated during operation of an embodiment of the present invention responsive thereto.

DETAILED DESCRIPTION OF THE PREFERRED EMBODIMENT

Figure 1A:
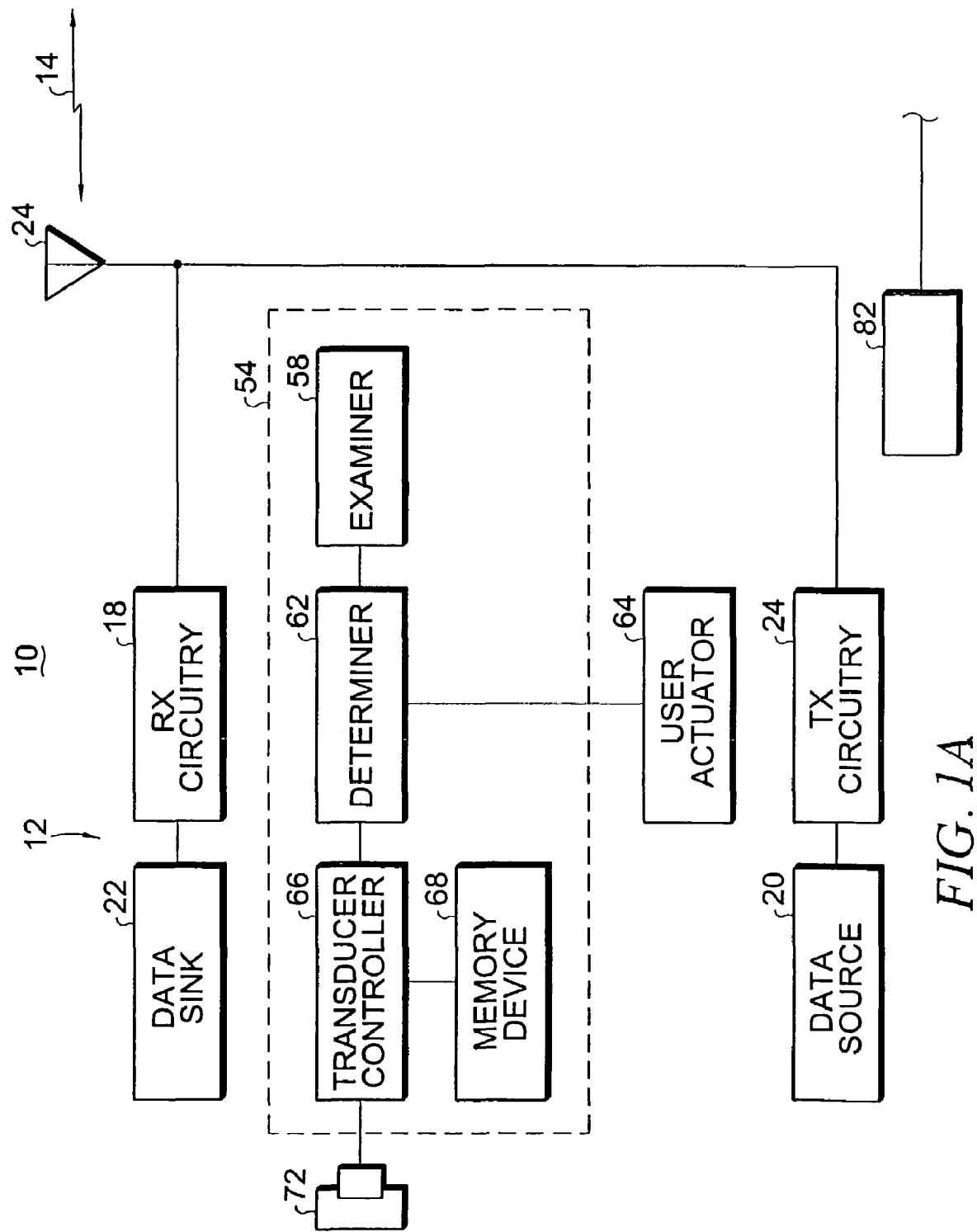
FIGS. 1A and 1B illustrate a functional block diagram of a communication system in which an embodiment of the present invention is operable.
Figure 1B:
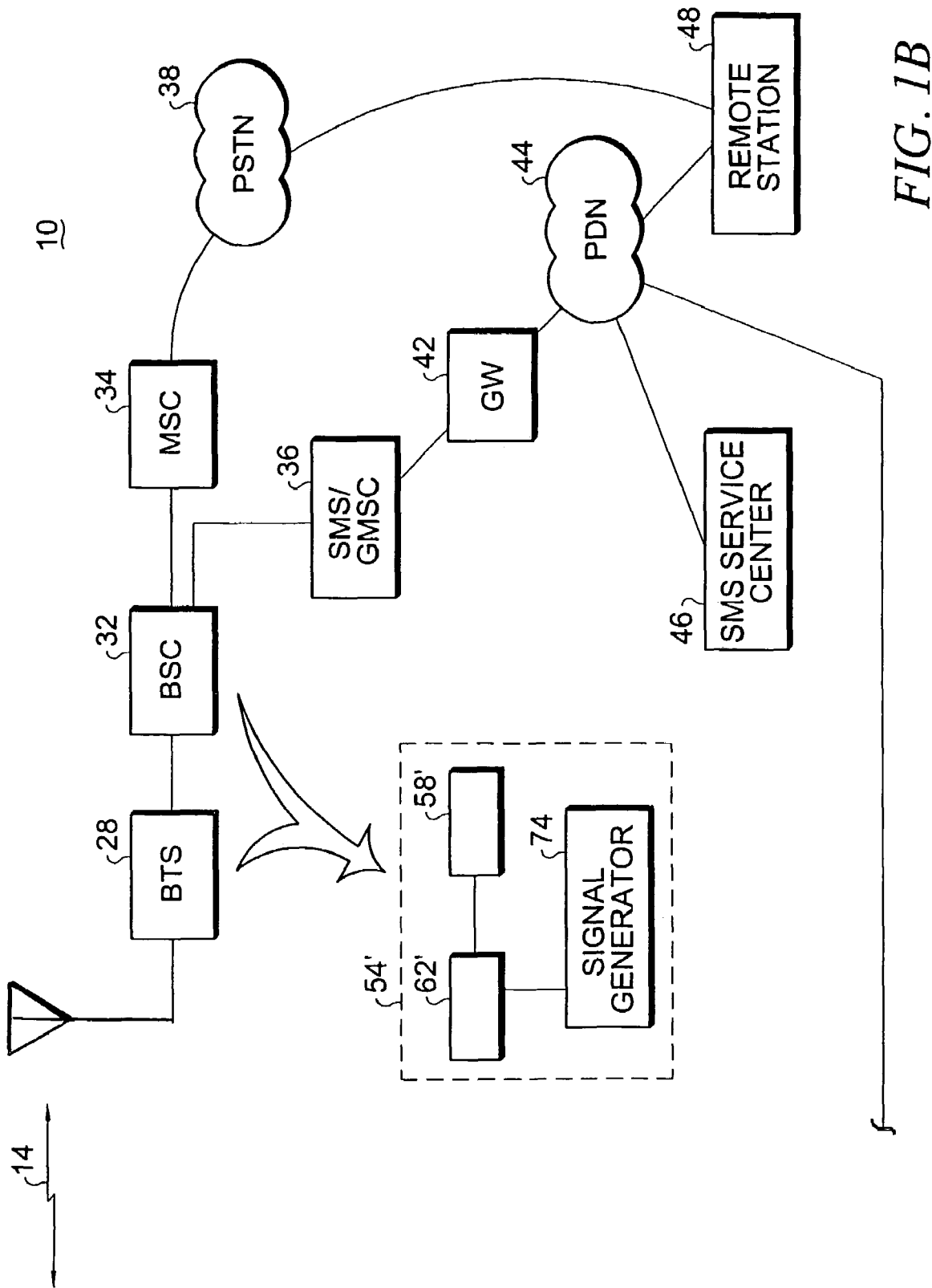

Referring first to FIGS. 1A and 1B, a portion of a cellular communication system, shown generally at 10, provides for wireless communication between a mobile terminal 12 and network infrastructure of the system by way of a radio link 14. In the exemplary implementation, the cellular communication system 10 forms a GSM (Global System for Mobile communications) cellular communication system which provides for both SMS (Short Message Service) messaging and WAP (Wireless Application Protocol) messaging. In other implementations, the communication system 10 forms other types of cellular, and other, communication systems. Embodiments of the present invention are similarly operable in such other communication systems and operation of such other embodiments of the present invention can analogously be described with respect thereto.

The mobile station 12 is formed of a receive portion including receive circuitry 18 and a data sink 22. The receive circuitry is coupled to an antenna transducer 24 which is operable to transduce electromagnetic signals transmitted upon the radio link 14 into electrical form and to provide such signals to the receive circuitry 18. The receive circuitry is operable to perform receive-circuitry operations on the signals applied thereto. Operations performed by the receive circuitry include, for instance, down-conversion and demodulation operations. Once operations have been performed upon the receive signals applied to the receive circuitry, baseband, demodulated, signals are applied to the data sink 22.

The mobile station 12 further includes a transmit portion including transmit circuitry 24 and a data source 26. Data to be transmitted by the mobile station is generated at, or provided to, the data source 26 and, thereafter, applied to the transmit circuitry. The transmit circuitry is operable to perform transmit-circuitry functions, such as up-conversion and modulation of the data to be communicated by the mobile station. The transmit circuitry is coupled to the antenna transducer which is operable to transduce, into electromagnetic form, transmit signals formed by the transmit circuitry.

The network infrastructure of the communication system is generally conventional of a GSM network which provides for SMS messaging. Here, the network portion of the communication system is shown to include a Base Transceiver Station (BTS) 28 operable to transceive communication signals upon the radio link 14. The base transceiver station defines a coverage area, referred to as a cell, within which communications with the mobile station are generally permitted. Forward link signals generated by the base transceiver station are transmitted upon the radio link 14 to the mobile station, and reverse link signals generated at the mobile station are communicated upon the radio link 14 to the base transceiver station. The base transceiver station is coupled to a Base Station Controller (BSC) 32. The base station controller is operable to control operation of the base transceiver station. Typically, a group of base transceiver stations are coupled to a signal base station controller, and the base station controller to which the group of base transceiver stations are coupled are controlled by the signal base station controller.

The base station controller 32, is, in turn, coupled to a Mobile Switching Center (MSC) 34 through which circuit-switched communication signals are routed, and to a Short Message Service/Gateway Mobile Switching Center (SMS/GMSC) 36 through which packet-switched communication signals are routed. In the exemplary implementation, the communication system provides for SMS messaging, the packets of which are routed through the GSMC 36. The GSMC is also representative of structure through which other packet-formatted signals are routed, such as WAP (Wireless Application Protocol) messages, as well as digital data communicated in other types of communication systems.

The mobile switching center 34 is here shown to be coupled to a Public-Switched, Telephonic Network (PSTN) 38, and the SMS/GMSC 36 is coupled, by way of a gateway 42, to a Packet Data Network (PDN), such as the Internet. A SMS service center 46 is coupled to the packet data network as is also a remote communication station 48. The remote communication station 48 is further coupled to the PSTN 38. The remote communication station 48 is a functional representation of a communication device operable to communicate circuit-switched, or packet-formatted, such as SMS, messages.

The mobile station also includes control circuitry 54. The control circuitry is operable to perform conventional control operations which control operation of the transmit and receive portions of the mobile station. The control circuitry 54 is further operable pursuant to an embodiment of the present invention by which selectably to annunciate reception at the mobile station of a circuit-switched call or a packet-data call or message thereat. Through operation of an embodiment of the present invention, a manner by which, and if, a message or call terminated at the mobile station is annunciated is selected by the user of the mobile station.

To effectuate this operation of the present invention, the control circuitry includes an examiner 58 coupled to receive indications of communication signals received at the receive portion of the mobile station. The examiner is operable to examine the indications for various selected indicia of the indications provided thereto. For instance, the examiner is selectably operable to examine the content of indications of the messages to determine a content-type of the message. The examiner is also, or alternately, operable to examine the identity of the sending party from which the message originated. And, alternately, or again also, the examiner is selectably operable to examine the indications to determine an indicia-type of the indication applied thereto. That is to say, the examiner examines the indications to determine whether the terminating message is a SMS message, a WAP message, a voice call, a fax call, etc.

A determiner 62 is coupled to the examiner 58 to receive indications of examinations made thereat. The determiner is operable responsive to the results of the examinations performed by the examiner to determine whether, and in what manner, to annunciate reception at the mobile station of a message or call. Selection made, for instance, by a user of the mobile station and entered by way of a user actuator, here an actuation keypad 64, also coupled to the determiner, provides a rule-set governing operation of annunciation selection and manner. The determiner is operable, based upon the rule-set and results of the examinations made by the examiner to select whether to annunciate, and in what manner to annunciate, delivery of a message or call to the mobile station.

Indications of determinations made by the determiner 62 are provided to a transducer controller 66 which is coupled to a memory device 68. The transducer controller controls operation of a transducer 72, here a speaker, to annunciate delivery of a message or call to the mobile station in a manner determined by the criteria of the rule-set of the determiner 62. The memory device stores indications of melodies or songs which are to be played upon selection by the determiner 62. Thereby, annunciation of termination of a call or message at the mobile station is selectably annunciated. Reselection of the manner by which annunciation is made is effectuated through additional user actuation of the actuation keypad 64 to amend or otherwise change the rule-set of the determiner.

In another implementation, portions of the control circuitry 54 are network-based, here indicated by 54'. The examiner and determiner, here 58' and 62' are operable in manners analogous to operation, described-above, with respect to the examiner and determiner 58 and 62. In this alternate implementation, however, a signal generator 74 is coupled to the determiner 62'. The signal generator 74 is operable to generate a signal of values indicative of determinations made by the determiner. The signal is thereafter transmitted by the base transceiver station 28 to the mobile station and utilized at the mobile station when the message or call is subsequently transmitted thereto. In this implementation, reselection of the rule-set stored at the determiner 62' is made, for instance, by instructions entered by a user of the mobile station at a computer station, such as the computer station 82 and communicated by way of the packet data network 44 to the control circuitry 54'. Selection and reselection of the rule-set can alternately be made in other manners, such as by way of reverse-link signals generated by the mobile station.

Figure 2:
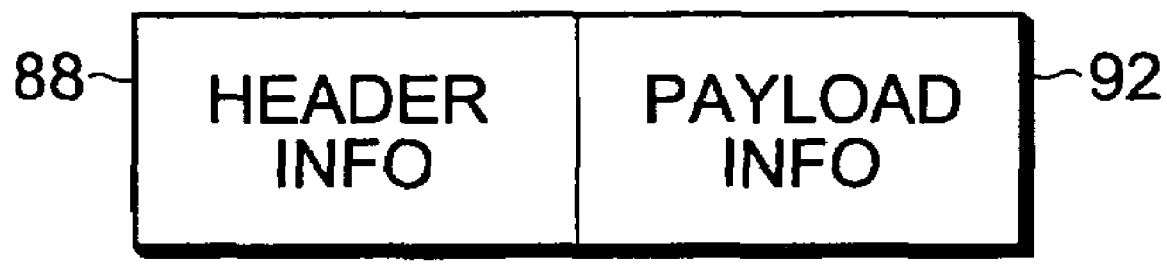
FIG. 2 illustrates a representation of an exemplary packet-formatted set of data communicated during operation of the communication system shown in FIG. 1.

FIG. 2 illustrates an exemplary packet-formatted message, shown generally at 86, exemplary of at least a portion of a packet-formatted message, capable of communication to the mobile station. The data packet 86 is here shown to include header information 88 and payload information 92. Examination is made by the examiner 58 of one or more of such packets to determine the various indicia of the terminating message at the mobile station and provides indications of such examinations to the determiner 62 so that the determiner is able to apply such indications to the rule-set contained thereat. Conventional, circuit switch, real time voice or data calls are examined by the examiner, for instance, by examining paging signals communicated to the mobile station before delivery of the voice or nonvoice, real time call thereat.

FIG. 3 illustrates a table, shown generally at 102, representing possible types of annunciations to be generated by the speaker 72 responsive to delivery at the mobile station of various different message. The table 102 is representative of an implementation of the present invention in which the examiner 58 examines messages to determine their content and, responsive thereto, the determiner applies a rule-set to determine in what manner, if any, to annunciate delivery of the message to the mobile station.

A column 104 is representative of the content of a message delivered, or to be delivered, to the mobile station 12. The second column 106 indicates an indicia-type of the message, the column 108 indicates the sending party at which the message originates, and the column 112 indicates the annunciation message generated by the speaker 72. The annunciation message 112 in each instance, here, in which an annunciation message is generated by the speaker 72 forms a portion of a song formed of successive aural tones. The aural tones forming the songs are stored, for instance, at the memory device 68.

In other implementations, and as described previously, the indicia-type or identity of the sending party, as indicated in the columns 106 and 108, respectively, are instead examined by the examiner.

Thereby, a manner is provided by which annunciate selectably messages and calls terminating at the mobile station. The user of mobile station is able to associate particular annunciations with particular terminating messages and calls. Thereby, prior to accepting a call or reviewing a message, the user is made aware of some indicia associated with the message or call.

The preferred descriptions are of preferred examples for implementing the invention, and the scope of the invention should not necessarily be limited by this description. The scope of the present invention is defined by the following claims.

I claim:

1. In a cellular radio communication system including a radio device having radio receiver circuitry for receiving messages having user-perceivable message content, an improvement of apparatus for annunciating the reception of a message having user-perceivable message content thereat, said apparatus comprising:
   an examiner coupled to receive indications of the user-perceivable content at least within a payload of the message, the examiner examining the indications to determine whether the content within the payload is described by a pre-determined annunciation rule;
   a memory device accessible to the examiner for storing pre-determined annunciation rules;
   a determiner coupled to receive indications of examinations made by said examiner, said determiner for determining whether or not to annunciate reception of the message and, only if reception of the message is to be annunciated, determining in what manner to annunciate reception of the message; and
   an annunciator coupled to receive indications of determinations made by said determiner, said annunciator for annunciating reception at the radio device of the message in a manner responsive to determinations by said determiner in order to selectively alert a user that the message has been received.

2. The apparatus of claim 1 wherein said examiner is positioned at the radio device.

3. The apparatus of claim 2 wherein said determiner and said annunciator are located at the radio device.

4. The apparatus of claim 1 wherein the radio communication system further comprises network infrastructure and wherein said examiner and said determiner are positioned at the network infrastructure.

5. The apparatus of claim 4 further comprising a determination signal generator coupled to said determiner, said determination signal generator for generating a determination signal for communication to the radio device, the determination signal of values representative of determinations made by said determiner.

6. The apparatus of claim 5 wherein the indications of the determinations made by said determiner to which said annunciator is coupled to receive comprise indications of the determination signal generated by said determination signal generator.

7. The apparatus of claim 1 wherein messages include information indicating the origin of a message, and wherein said examiner further examines the origination-location information.

8. The apparatus of claim 7 wherein determinations made by said determiner are further responsive to examination of the origin-locations examined by said examiner.

9. The apparatus of claim 8 wherein said determiner determines to annunciate reception of the message if the message origin is determinable.

10. The apparatus of claim 9 wherein said determiner determines not to annunciate the message reception if the message origin location is not determinable.

11. The apparatus of claim 1 wherein said annunciator comprises an aural annunciator.

12. The apparatus of claim 11 wherein said aural annunciator is operable to generate a first and at least a second sequence of aural tones s that the user is able to determine which annunciation rule applies.

13. The apparatus of claim 1 wherein the radio communication system comprises a GSM (Global System for Mobile communication) cellular communication system provided SMS (Short Message Service) messaging and wherein message comprises a SMS message.

14. The apparatus of claim 1 wherein the radio communication system comprises a cellular communication system operable pursuant to the WAP (Wireless Application Protocol) protocol and wherein the message comprises WAP message.

15. In a method for communicating in a cellular radio communication system including a cellular radio device having radio receiver circuitry for receiving messages having user-perceivable content, an improvement for annunciating the reception of the message thereat, said method comprising:

examining indications of the user-perceivable content communicated to the cellular radio device to determine whether the content is described by a predetermined annunciation rule, the content being at least within a payload of the message;

determining whether or not to annunciate reception of the message and, only if reception of the message is to be annunciated, determining in what manner to annunciate reception of the message; and annunciating reception at the cellular radio device of the message determiner in order to selectively alert a user that the message has been received.

16. The method of claim 15 wherein said operations of examining, determining, and annunciating are performed at the cellular radio device.

17. The method of claim 15 wherein the radio communication system further comprises network infrastructure and wherein said operations of examining and determining are performed at the network infrastructure.

18. The method of claim 17 comprising the additional operation of sending indications of determinations made during said operation of determining to the cellular radio device and wherein said operation of annunciating is performed at the radio device.

19. The method of claim 17, wherein the operation of determining is performed at least in part by application of a rule set previously uploaded from the cellular radio device.

20. The method of claim 17, wherein the operation of determining is performed at least in part by application of a rule set according to a subscription option chosen by a subscriber associated with the cellular radio device.

* * * * *